(12) United States Patent
Sammy et al.

(10) Patent No.: US 9,145,597 B2
(45) Date of Patent: Sep. 29, 2015

(54) SIMULTANEOUS MULTI-MODE GAS ACTIVATION DEGASSING DEVICE FOR CASTING ULTRACLEAN HIGH-PURITY METALS AND ALLOYS

(71) Applicant: ALMEX USA, INC., Buena Park, CA (US)

(72) Inventors: Ricardo Sammy, Walnut, CA (US); Ravindra V. Tilak, Orange, CA (US)

(73) Assignee: ALMEX USA INC., Buena Park, CA (US)

( * ) Notice: Subject to any disclaimer, the term of this patent is extended or adjusted under 35 U.S.C. 154(b) by 113 days.

(21) Appl. No.: 13/774,789

(22) Filed: Feb. 22, 2013

(65) Prior Publication Data

US 2014/0238197 A1 Aug. 28, 2014

(51) Int. Cl.
*C22B 21/06* (2006.01)
*C22B 9/02* (2006.01)
*B22D 1/00* (2006.01)

(52) U.S. Cl.
CPC . *C22B 21/06* (2013.01); *B22D 1/00* (2013.01); *C22B 9/02* (2013.01); *C22B 21/068* (2013.01)

(58) Field of Classification Search
CPC .......... C22B 21/06; C22B 9/02; C22B 21/068
USPC .......................................... 266/81, 208, 215
See application file for complete search history.

(56) References Cited

U.S. PATENT DOCUMENTS

| | | | |
|---|---|---|---|
| 2,809,107 A | 10/1957 | Russell | |
| 2,997,385 A * | 8/1961 | Winter, Jr. | ........................ 75/617 |
| 3,434,823 A | 3/1969 | Adamec | |
| 3,645,520 A | 2/1972 | Acre et al. | |
| 3,743,263 A | 7/1973 | Szekely | |
| 3,895,937 A | 7/1975 | Gjosteen et al. | |
| 4,014,529 A | 3/1977 | Puzhailo et al. | |
| 4,235,627 A | 11/1980 | Dantzig et al. | |
| 4,261,197 A | 4/1981 | Mansfield | |
| 4,287,755 A | 9/1981 | Mansfield | |

(Continued)

FOREIGN PATENT DOCUMENTS

| | | |
|---|---|---|
| CN | 201665699 U | 12/2010 |
| CN | 101985698 | 3/2011 |

(Continued)

OTHER PUBLICATIONS

Hatch, John E. Aluminum: Properties and Physical Metallurgy. 1984. pp. 16 and 17.*

(Continued)

*Primary Examiner* — George Wyszomierski
*Assistant Examiner* — Tima M McGuthry Banks
(74) *Attorney, Agent, or Firm* — Knobbe Martens Olson & Bear LLP

(57) ABSTRACT

An "in-line" device to continuously remove dissolved gasses from liquid metal is described. The device described herein may contain an apparatus to create a partial vacuum, one or more ultrasonic vibrators below the surface of the liquid metal to evolve gas bubbles within the metal, and a high-frequency vibrating metal plate which the fluid must pass over at a low depth. The device may be used to create high quality metals, including aluminum and aluminum alloy for a number of demanding applications such as pharmaceutical, semiconductor, foil, and aerospace applications including Aluminum-Lithium alloys.

18 Claims, 2 Drawing Sheets

(56) References Cited

U.S. PATENT DOCUMENTS

| | | | |
|---|---|---|---|
| 4,373,950 | A | 2/1983 | Shingu et al. |
| 4,378,242 | A | 3/1983 | Harris et al. |
| 4,662,215 | A | 5/1987 | Eckert |
| 4,763,513 | A | 8/1988 | Zacharias |
| 4,770,699 | A | 9/1988 | Mountford |
| 5,167,698 | A | 12/1992 | Miyagawa et al. |
| 5,234,202 | A * | 8/1993 | Pelton ............ 266/225 |
| 5,364,078 | A | 11/1994 | Pelton |
| 5,415,680 | A | 5/1995 | Eckert |
| 5,803,106 | A | 9/1998 | Cohen et al. |
| 5,846,481 | A | 12/1998 | Tilak |
| 6,244,738 | B1 | 6/2001 | Yasuda et al. |
| 6,334,336 | B1 * | 1/2002 | Takei et al. ............ 65/134.2 |
| 6,429,575 | B1 | 8/2002 | Abramov et al. |
| 6,736,010 | B1 | 5/2004 | Muller et al. |
| 7,021,145 | B2 | 4/2006 | Hill |
| 7,439,654 | B2 * | 10/2008 | McDermott et al. ..... 310/323.19 |
| 7,666,248 | B2 | 2/2010 | Belley et al. |
| 7,682,556 | B2 | 3/2010 | Han et al. |
| 8,025,712 | B2 * | 9/2011 | Dupuis et al. ............ 75/680 |
| 8,357,292 | B2 * | 1/2013 | Crocker ............ 210/85 |
| 2002/0121158 | A1 | 9/2002 | Otaki et al. |
| 2007/0235159 | A1 * | 10/2007 | Han et al. ............ 164/66.1 |
| 2011/0247456 | A1 | 10/2011 | Rundquist et al. |

FOREIGN PATENT DOCUMENTS

| | | |
|---|---|---|
| CN | 201873727 U | 6/2011 |
| RU | 2361938 | 7/2009 |
| WO | WO 86/06749 | 11/1986 |

OTHER PUBLICATIONS

Schwartz, Harold. ProKon. "Aluminum". Version 8.6. 1997-98.*
Mendez-Gallon et al. German Patent DE 102005060846 published Jun. 21, 2007. Machine translation of the description.*

* cited by examiner

SIMULTANEOUS MULTI-MODE GAS ACTIVATION DEGASSING DEVICE FOR CASTING ULTRACLEAN HIGH-PURITY METALS AND ALLOYS

BACKGROUND OF THE INVENTION

1. Field of the Invention

The present invention generally relates to an apparatus for removing dissolved gasses from liquid metals. More specifically, the present invention relates to an inline Multi-Mode Gas Activation (MGA) degassing apparatus which may be used to remove dissolved hydrogen from liquid aluminum or aluminum alloys as part of a continuous or semi-continuous casting operation. The invention is particularly useful on aluminum alloys which are required to be cast in ultraclean conditions and on alloys which inherently have high solubility of hydrogen, such as aluminum-lithium alloys and aluminum-magnesium alloys.

2. Description of Related Art

Metal manufacturing and casting, such as aluminum manufacturing and casting, involves a considerable number of different components. Generally, a casting line will have a furnace that heats aluminum into a liquid and various casting assemblies that can be used to create particular shaped aluminum pieces. Casting lines will also typically have various components that are directed towards purifying the metal into a desired level of purity for a particular application.

For example, high-purity aluminum and aluminum alloys are used for applications in a large number of industries, such as pharmaceutical, semiconductor, foil, and aerospace applications. In these applications, the smaller the amount of impurities, the higher is the uniformity of the material. In some applications, high-purity aluminum and aluminum alloys are characterized by ultra low hydrogen content, in the range of less than 0.07 cc/100 gm Al, and further by exceptionally low impurity content of inclusions in the range of 0.005 $mm^2$/kg.

To obtain high-purity aluminum and aluminum alloys a variety of different degassing techniques can be employed. In one technique, liquid aluminum containing impurities is exposed to Argon gas that bubbles through the liquid aluminum and engages with the impurities causing the impurities to be captured on the gas bubble and then removed from the aluminum melt. This technique is suitable for small and large volume aluminum casting lines; lines that are producing, for example, from 50 lbs to over 500 lbs of aluminum per minute. The art of degassing with argon and halogen gas is described in U.S. Pat. Nos. 3,645,520; 3,743,263; 5,234,202; 5,364,078; and 5,846,481.

However, many difficulties occur with such processing lines. First is that Argon is an expensive material and this process requires continuous use of this gas. This process also requires sophisticated gas delivery and recovery systems which can also add to the cost of producing high purity aluminum.

The practice and technique of degassing aluminum with vacuum is given in: U.S. Pat. Nos. 5,415,680; 3,895,937; 2,809,107; 5,167,698; 4,378,242; 4,014,529; 2002/0121158A1; U.S. Pat. No. 7,666,248B2; Chinese patents 101985698, 201873727, 201665699; WO8606749A1; Russian patent 2361938. The practice of applying ultrasonic energy for the degassing purpose is disclosed in U.S. Pat. Nos. 7,682,556; 4,287,755; 4,235,627; 4,662,215; 4,770,699; 4,261,197; 6,736,010B1; 7,021,145B2; 4,763,513; 4,373,950; 6,429,575B1; 6,244,738B1; 5,803,106; 2001/0, 2247,456; 3,434,823.

The application of ultrasonic methods for degassing metals has so far been tried only on stagnant metals in batch processes and not on continuously moving metal systems. The stagnant melts are quickly prone to generation of "standing waves" in the molten metal batch and effectively a very low volume of the melt is degassed even though the energy is applied to the entire melt. Therefore, the use of in-situ cavitation method to enhance the diffusivity of hydrogen atoms so that they will rapidly transport themselves and nucleate as hydrogen molecules for their effective removal from the melt, requires simultaneous existence of mechanized fluid flow which the present art fails to provide.

Other ways to purify aluminum or aluminum alloys, which involve using low pressure systems that draw the hydrogen gas out of the liquid aluminum, are typically limited to small batch operations that use such low pressure vacuum systems. These small-batch vacuum systems consist of a small vacuum chamber where liquid aluminum is introduced in small batch quantities ranging from 5 to 10 pounds. Although this method is able to achieve sufficient quality, the amounts produced in small batches and the resources needed to produce these small batches makes this a very costly and inefficient method of manufacturing high-purity aluminum in larger tonnages or in a continuous manner. Consequently, these types of systems are generally not used for high volume aluminum production lines. The method of vacuum degassing large tonnages of Aluminum from 1 ton to 20 tons is practiced today in Russia, however, the cost of the furnace is extremely high and the benefit is lost during the transit as the aluminum is transported from vacuum furnace to casting station when it regasses itself due to atmospheric humidity.

Hence, there is a need for an improved process and system for purifying metals and, in particular, purifying aluminum and its alloys in such a way that the purification is carried out "in-line" and close to the casting system in a continuous manner. Additionally, there is a need for a process and system that removes impurities such as hydrogen without requiring the introduction of large quantities of expensive gases and the accompanying equipment to safely deal with these gases. In addition, there is a need to achieve degassing values close to the thermodynamically possible values by simultaneously providing other means of activating the diffusion of hydrogen atoms.

SUMMARY OF THE INVENTION

Accordingly, an inline degassing apparatus is desired wherein the device is able to produce higher purity aluminum and aluminum alloys in a more efficient manner, at a significantly higher production rate, and at previously unattainable levels of quality. Certain features, aspects, and advantages of an embodiment of the present invention also provide a superior inline degassing apparatus configured to remove dissolved gasses from a liquid metal. This inline degassing apparatus may include an inlet chamber configured to contain a volume of liquid metal, the inlet chamber capable of being configured to be in fluid communication to a launder containing a liquid metal and an outlet chamber in fluid communication with the inlet chamber, wherein the outlet chamber is also capable of being in fluid communication to a launder containing a liquid metal. The apparatus may further comprise one or more dams to control fluid flow, an air venturi ejector capable of creating a partial vacuum in one or more of the inlet and outlet chambers, one or more ultrasonic probes placed inside the inlet chamber in a location which may be below the fluid level of the inlet chamber when the apparatus is in use, and a high-frequency vibrator configured to make a surface vibrate at a high frequency (approximately 20 oscillations per second), the surface placed such that fluid must flow over the surface to transit between the inlet chamber and the outlet chamber of the apparatus.

In some embodiments, the liquid metal may be one of aluminum or an aluminum alloy. In some embodiments, the dissolved gas to be removed may be hydrogen and the apparatus may be configured to reduce dissolved hydrogen to at least approximately 0.07 cc/100 grams of aluminum or less. In some embodiments, the apparatus may be configured to reduce dissolved hydrogen to at least approximately 0.07 cc per 100 grams of aluminum or less while maintaining the liquid aluminum within the apparatus for approximately five minutes or less.

In some embodiments, the apparatus may be capable of removing dissolved gas from liquid metal at a rate of at least 1000 lbs of liquid metal per hour. In some embodiments, the one or more dams may comprise exactly two dams to control fluid flow. In some embodiments, the air venturi ejector may be capable of maintaining negative gauge pressures of at least approximately negative 200 millibars. In some embodiments, the air venturi ejector may be capable of generating a negative pressure sufficient to raise the level of a liquid metal at least approximately 10 inches or higher.

In some embodiments, the one or more ultrasonic probes may comprise between two and eight ultrasonic probes. In some embodiments, the one or more ultrasonic probes may generate ultrasonic waves at frequencies between approximately 10 kHz and 50 kHz. In some embodiments, the high-frequency vibrator may comprise a high-frequency pneumatic vibrator. In some embodiments, the inlet chamber and the outlet chamber may be lined with high conductivity refractory material and are insulated to minimize heat loss. In some embodiments, the surface which is made to vibrate by the high-frequency vibrator may be positioned above a high thermal conductivity refractory baffle placed between the inlet chamber and the outlet chamber. In some embodiments, the apparatus may further comprise one or more heating elements to maintain the temperature of liquid metal within the inlet or outlet chamber of the degassing apparatus. In some embodiments, the apparatus may be configured to remove dissolved gases from a flow of liquid metal in a continuous or a semi-continuous casting environment.

These and other objects and advantages of the present invention will become more apparent from the following description in conjunction with the accompanying drawings.

BRIEF DESCRIPTION OF THE DRAWINGS

The following drawing and the associated descriptions are provided to illustrate embodiments of the present disclosure and do not limit the scope of the claims.

Figure 1:
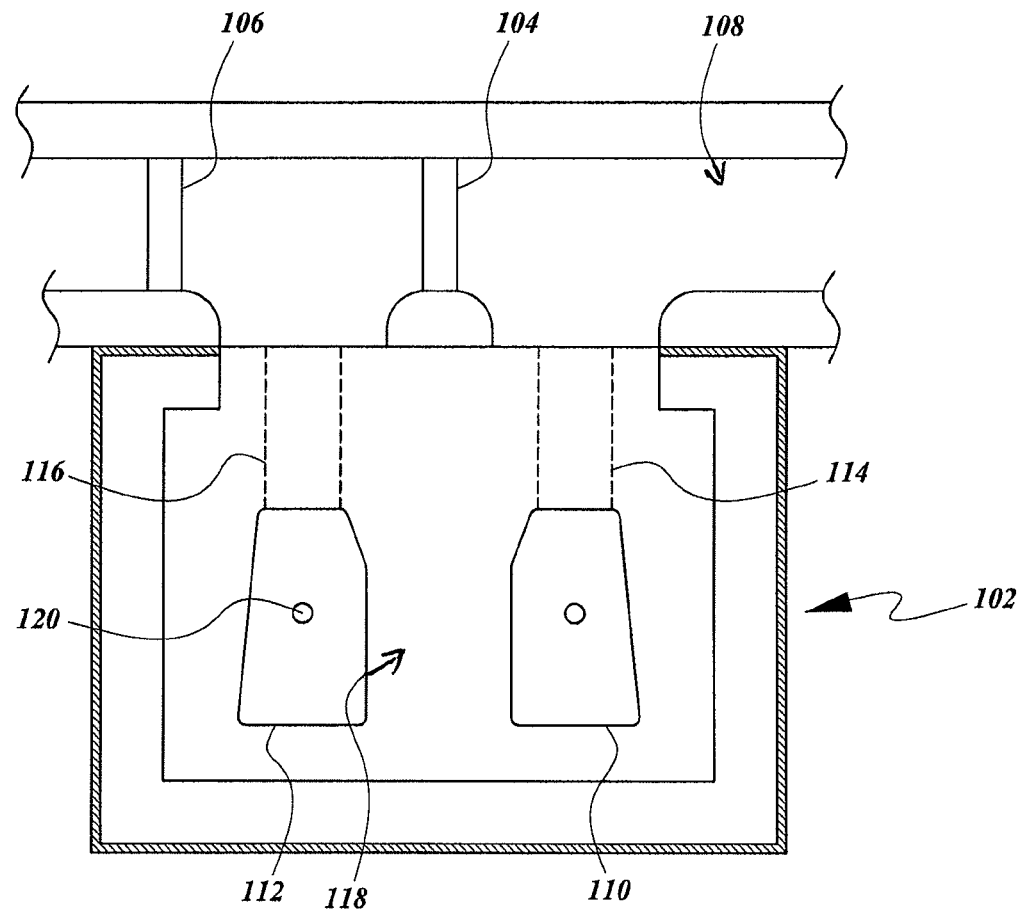
FIG. 1 illustrates a top-down cross-section view of an embodiment of an inline degassing apparatus.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION OF THE PREFERRED EMBODIMENT

Figure 2:
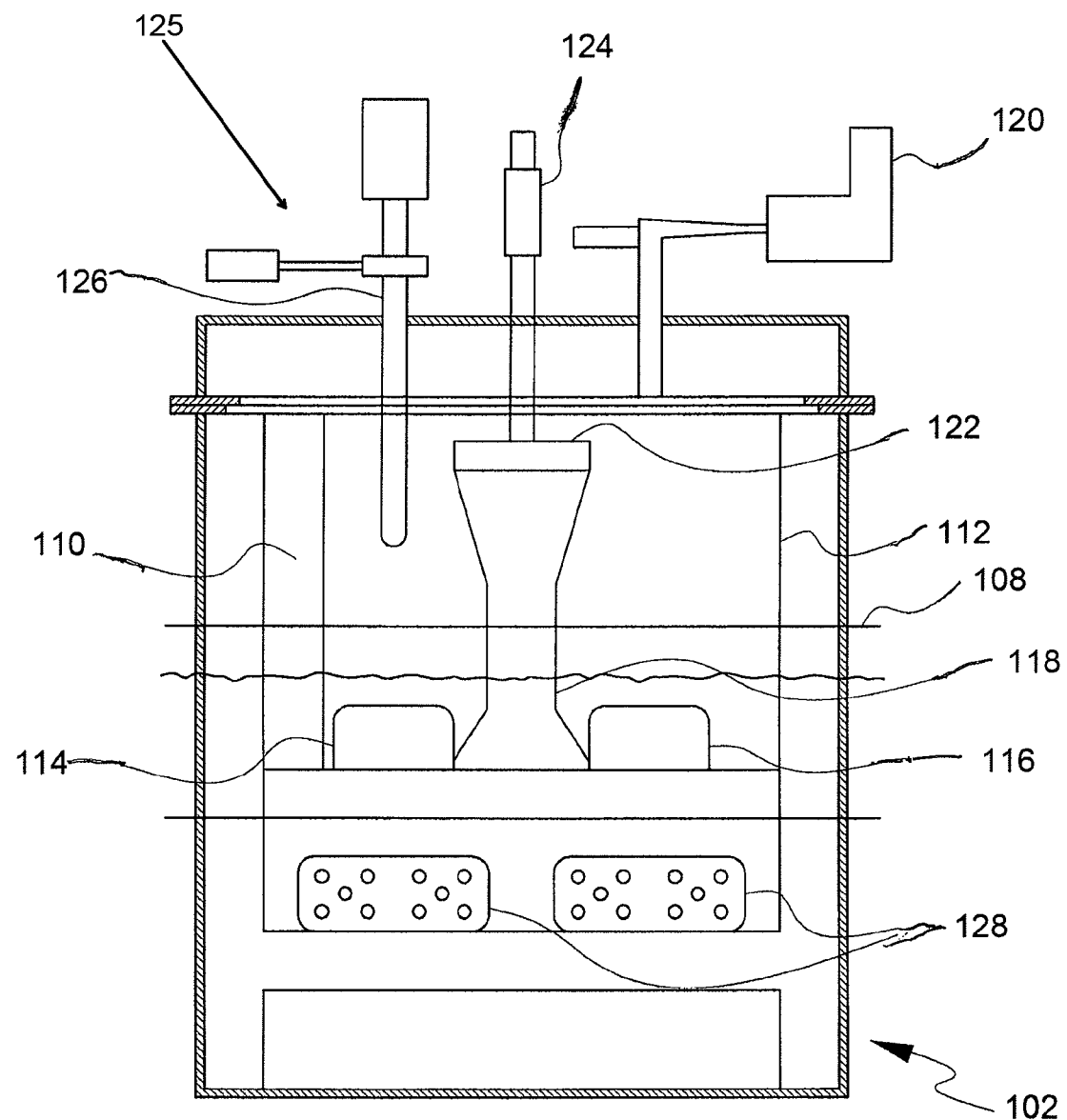
FIG. 2 illustrates a cross-section view of an embodiment of an inline degassing apparatus.

FIG. 1 illustrates a top-down view of an embodiment of an inline degassing apparatus 102 and FIG. 2 illustrates a side view of the same inline degassing apparatus 102. The degassing apparatus 102 abuts a launder 108, which may contain a flow of a fluid. For example, the launder 108 may contain a liquid metal that is to be casted, such as aluminum or an aluminum alloy. The degassing apparatus 102 contains an inlet chamber 110 and an outlet chamber 112. These two chambers may contain a flow of a fluid when in use, and may be in fluid communication with the launder 108 through one or more inlet openings 114 and one or more outlet openings 116.

The inlet chamber 110 and outlet chamber 112 may be lined with a high-conductivity refractory material and may be insulated to minimize heat loss. This refractory material and insulation may allow the liquid metal within the inlet chamber 110 and outlet chamber 112 to retain a larger proportion of its heat, and may therefore reduce the cost of heating the liquid metal within the degassing apparatus 102.

The inlet chamber 110 and outlet chamber 112 may be partially separated from each other by a high thermal conductivity refractory baffle 118. This refractory baffle 118 may have a height that is some proportion of the height of the inlet chamber 110 and/or outlet chamber 112. For example, the refractory baffle 118 may be 25%, 50%, 75% or some other proportion of the height of the inlet chamber 110 and/or outlet chamber 112. This refractory baffle 118 may be positioned at the base of the inlet chamber 110 and/or outlet chamber 112, and may therefore block fluid flow between the two chambers, except for fluid that flows overtop of the refractory baffle 118 in the manner that will be described in greater detail below.

Above this high-thermal conductivity refractory baffle 118, there may be a metal plate 122 (FIG. 2) connected to a high-frequency pneumatic vibrator 124. This metal plate 122 may be coated with Silicon Carbide or similar molten metal attack resisting material and may be positioned such that fluid may flow over the plate 122 from the inlet chamber 110 to the outlet chamber 112.

There may also be two dams in the launder 108 adjacent to the degassing apparatus 102: a bypass dam 104 and a control dam 106. These dams 104, 106 may be configured such that each dam is capable of being either open, and allowing fluid to flow down the launder 108 past the dam, or closed, and obstructing the flow of fluid down the launder 108.

When the degassing apparatus 102 is not in use, both the bypass dam 104 and the control dam 106 may be opened, allowing liquid metal, such as aluminum or aluminum alloys, to flow directly though the launder 108. The liquid metal may be flowing from a furnace (not shown) to a casting table (not shown) or to some other component. The dams 104, 106 are operated to divert the flow of liquid metal into the degassing apparatus 102 to achieve a higher level of purification when such higher level of purification is needed.

More specifically, to begin to use the degassing apparatus 102, the control dam 106 may be closed. This may cause liquid metal to flow into the inlet chamber 110 and outlet chamber 112 of the degassing apparatus 102 through the inlet opening 114 and the outlet opening 116 located at the bottom the inlet chamber 110 and outlet chamber 112. When the liquid metal covers the small inlet opening 114 and small outlet opening 116 and forms a seal, an air venturi ejector 120 may begin to remove air from the inlet chamber 110 and outlet chamber 112 and create a partial vacuum in the inlet chamber 110 and outlet chamber 112. This partial vacuum may cause the liquid metal within both the inlet chamber 110 and outlet chamber 112 to rise.

The air venturi ejector 120 may continue to remove air from the inlet chamber 110 and outlet chamber 112 and to create a stronger partial vacuum until some specified stopping point is reached. For example, the air venturi ejector 120 may be used to create a partial vacuum strong enough to raise the level of the liquid metal to a specified depth. The air venturi ejector may also be used to create a specified air pressure in the inlet chamber 110 and outlet chamber 112. The desired air pressure may depend in part upon the type of liquid metal that is being degassed, the temperature of the liquid metal, and density of the liquid metal, the purity of the liquid metal, or other factors. A Laser sensor or a dipped inductive sensor may be used to control and hold the level of vacuum to make the metal level rise to a precise point inside the degasser.

When the air venturi ejector 120 has reached a specified stopping point, the air venturi ejector 120 may then be used to maintain a stable air pressure and/or to maintain a stable fluid level of the liquid metal inside the inlet chamber 110 and outlet chamber 112. This partial vacuum inside the inlet chamber 110 and outlet chamber 112 may help, in conjunction with other features of the degassing apparatus 102, to remove gasses that are dissolved in the liquid metal material. The advantage of the vacuum is to reduce the activation barrier (by expanding the liquid) for the gas to easily transport from the molten metal matrix, in which it remains dissolved, into the cavitation of the interstitial vacancies created by the passing of the ultrasound waves.

When the air venturi ejector 120 has reached its specified stopping point, the bypass dam 104 may then be closed, and the control dam 106 may then be opened. The closure of the bypass dam 104 and opening of the control dam 106 may have the effect of creating a fluid flow path for liquid metal. Liquid metal may flow down the launder 108, into the inlet chamber 110 through the inlet opening 114, over the refractory baffle 118 between the inlet chamber 110 and the outlet chamber 112, down the outlet chamber 112 and into the launder 108 through the outlet opening 116, and down the launder 108 through the opening created by the open control dam 106. This flow path may ensure that all the liquid metal flowing down the launder 108 passes through the degassing apparatus 102, and is therefore degassed by the degassing apparatus 102.

FIG. 2 illustrates a cross-section view of the degassing apparatus 102 in greater detail. When the degassing apparatus 102 is in use, fluid may flow from the launder 108 into an inlet chamber 110 through the inlet opening 114 between the inlet chamber 110 and the launder 108.

The fluid level inside the degassing apparatus 102 may be higher than the fluid level outside the degassing apparatus 102, due, at least in part, to a partial vacuum created within the degassing apparatus 102 by the air venturi ejector 120. The air venturi ejector 120 may be used to create and maintain a partial vacuum within the degassing apparatus 102, such that the fluid level inside the degassing apparatus 102 may be higher than the level of a metal plate 122 which is attached to a high-frequency vibrator 124 and which is positioned above a high thermal conductivity refractory baffle 118 positioned between the inlet chamber 110 and the outlet chamber 112.

The degassing apparatus 102 may also have heating elements 128 operable to maintain the temperature of liquid metal contained within both the inlet chamber 110 and outlet chamber 112. The heating elements 128 may be preferably controlled to maintain the liquid metal at a temperature selected to facilitate degassing.

The apparatus 102 may include a wave source 125 which may be one or more ultrasonic probes 126 placed inside the inlet chamber 110. For example, there may be one, two, three, four, or more ultrasonic probes 126. The number of ultrasonic probes 126 used may depend upon the liquid metal to be degassed, the desired level of degassing to be obtained, the volume of the chamber containing the ultrasonic probes, the flow rate of the liquid metal, or other factors. These ultrasonic probes 126 may be placed such that they will be below the level of the fluid within the inlet chamber 110 when the degassing apparatus 102 is in use.

The ultrasonic probes 126 may be configured to create ultrasonic waves beneath the surface of the fluid in the inlet chamber 110 at one of more frequencies and amplitudes. These frequencies may be chosen based upon the properties of the fluid in the inlet chamber, such as the type of liquid metal that is used, the temperature of the metal, the type of gasses that may be dissolved in that liquid metal, and other factors. For example, ultrasonic probes 126 may be used which operate at frequencies between 20 kHz and 70 Khz, between 20 kHz and 50 kHz, between 25 kHz and 40 kHz, or in other frequency ranges. The amplitudes may be automatically adjusted based on the frequency used. These ultrasonic probes 126 may stimulate the evolution of micro bubbles in the liquid metal. The micro bubbles may then be composed of dissolved gas, such as hydrogen, and rise to the surface of the liquid metal.

From the inlet chamber 110 containing one or more ultrasonic probes 126, the liquid metal may flow over the metal plate 122 which may be attached to the high-frequency vibrator 124. This metal plate 122 may be configured to vibrate at a high-frequency such as within the range of 1,000 to 10,000 vibrations per minute. Such high frequency vibration may also stimulate the formation of gas bubbles on the nucleation sites such as inclusions within the liquid metal which may evolve gasses or in-turn may disturb the liquid metal so that gas bubbles are pushed nearer the surface of the fluid. It may be advantageous to maintain a fluid level such that fluid depth above this metal plate 122 is low. By maintaining a low fluid depth over the vibrating metal plate 122, the fluid, and therefore the gas within the fluid, may be forced nearer to the surface of the fluid exposing it to an atmosphere of very low partial pressure of gas created by the application of vacuum. Maintaining a low fluid level may also increase the effectiveness of the metal plate 122 in vibrating the fluid and pushing gas bubbles within the fluid nearer to the surface. In one particular implementation, the fluid flowing over the plate 122 is aluminum and has a depth of approximately 1/16 of an inch to approximately 1 inch.

Below the metal plate 122, and separating the inlet chamber 110 and the outlet chamber 112, there may be a high thermal conductivity refractory baffle 118. As discussed above, this baffle 118 may prevent fluid from flowing between the two chambers except for fluid that flows over the metal plate 122 attached to the high-frequency vibrator 124.

Therefore, the degassing apparatus 102 may contain three different mechanisms for degassing the fluid. First, the degassing apparatus 102 may contain the air venturi ejector 120 which is able to create a vacuum within an inlet chamber 110 and outlet chamber 112 that the fluid flows through. This vacuum may increase the diffusion of gas atoms within the fluid by decreasing the partial pressure of the gas in the atmosphere above the fluid. This may have the effect of reducing the level of dissolved gasses within the fluid. Second, the degassing apparatus 102 may contain one or more ultrasonic probes 126. These ultrasonic probes 126 may be placed in the fluid, and may cause the evolution of gas bubbles to develop in the fluid. Third, the degassing apparatus 102 may force the fluid to pass over a high-frequency vibrating metal plate 122 at a shallow fluid depth. This vibrating metal plate 122 may further ease the formation, coalescence, and release of the gas bubbles to form in the fluid. The vibrating metal plate 122 may also cause a stirring or mixing effect in the shallow fluid, which may cause more gas bubbles within the fluid to rise to the surface of the fluid.

These three simultaneously operating multi-mode mechanisms for degassing the fluid may work together in order to achieve significantly better results together than they may achieve when used separately. For example, the use of one or more ultrasonic probes may achieve some level of degassing on their own, but this effect may be dramatically improved in the presence of a strong partial vacuum. This effect may be further improved when fluid is forced to flow over an area with a very shallow fluid depth, and even more so when that shallow depth is accompanied by a high-frequency vibrating mechanical plate. The synergy of these methods may allow liquid metal to be degassed in a manner that is significantly faster, more efficient, and scalable to a larger capacity than previous methods of degassing liquid metal. For example, while certain prior methods of vacuum degassing a liquid metal were only useful for a small quantity, such at 5 to 10 pounds, of liquid metal and would require 30 minutes to degas this quantity, a degassing apparatus of the type described may be capable of treating liquid metal at rates greater than approximately 200, 500, 1000, or 5000 lbs/hr and complete the gas removal process in less than five (5) minutes of liquid's residence time inside the degassing chamber.

In some embodiments of a degassing apparatus disclosed herein, liquid metal may only need to be treated within the degassing apparatus for 15, 10, or even 5 minutes or less. This substantial increase in throughput and accompanying reduction in treatment time may be possible through the combination of multiple means which work together to reduce the levels of dissolved gas within the liquid metal. These increases in efficiency may enable liquid metal to be degassed in significantly less time and at significantly less cost than previous degassing technologies. These increases in efficiency may also enable the apparatus to be used as part of a continuous or semi-continuous casting operation, rather than merely used to purify batches of liquid metal at a time.

Even at these rates of treating liquid metal, a degassing apparatus of the described type may be capable of significantly reducing the dissolved gases in a liquid metal product. For example, if the liquid metal is aluminum or an aluminum alloy and the dissolved gas is hydrogen, an apparatus of the described type may be capable of reducing the dissolved hydrogen to 0.5, 0.25, 0.15, or even 0.07 cubic centimeters per 100 grams of aluminum or aluminum alloy. This reduction may be made even while treating a large volume of liquid metal at a high throughput rate, through the synergistic effects of the various components of the degassing apparatus.

Although the foregoing has shown, illustrated and described various embodiments and implementations of the present invention, it will be apparent that various changes, substitutions, modifications and uses of the described embodiments may be made by those skilled in the art without departing from the scope of the present invention. Hence, the present invention should not be limited to the foregoing discussion but should be defined by the appended claims.

What is claimed is:

1. A Multi-Mode Gas Activation degassing apparatus for removing dissolved gasses from liquid metal, the apparatus comprising:

an inlet chamber configured to contain a volume of liquid metal, the inlet chamber that receives liquid metal from a source of liquid metal;

an outlet chamber in fluid communication with the inlet chamber, wherein the outlet chamber outputs degassed liquid metal;

a flow control system that controls a flow of the liquid metal into and out of the inlet and outlet chambers;

a vacuum source that creates at least a partial vacuum in one or more of the inlet and outlet chambers;

one or more ultrasonic probes placed inside the inlet chamber in a location which may be below a fluid level of the inlet chamber when the apparatus is in use; and a high-frequency vibrator configured to make a surface vibrate at a high frequency, the surface placed such that fluid must flow over the surface to transit between the inlet chamber and the outlet chamber of the apparatus.

2. The apparatus of claim 1, wherein the liquid metal is one of aluminum or aluminum alloy.

3. The apparatus of claim 2, wherein the dissolved gas to be removed is hydrogen, and wherein the apparatus is configured to reduce dissolved hydrogen to at least approximately 0.07 cc/100 grams of aluminum or less.

4. The apparatus of claim 3, wherein the apparatus is configured to reduce dissolved hydrogen to at least approximately 0.07 cc per 100 grams of aluminum or less while maintaining the liquid aluminum within the apparatus for approximately five minutes or less.

5. The apparatus of claim 1, wherein the apparatus is capable of removing dissolved gas from liquid metal at a rate of at least 1000 lbs of liquid metal per hour.

6. The apparatus of claim 1, wherein the flow control system comprises one or more dams to control fluid flow.

7. The apparatus of claim 1, wherein the vacuum source is an air venturi ejector capable of maintaining negative gauge pressures of at least approximately −200 millibars.

8. The apparatus of claim 1, wherein the vacuum source is an air venturi ejector capable of generating a negative pressure sufficient to raise a level of a liquid metal at least approximately 10 inches.

9. The apparatus of claim 1, wherein the one or more ultrasonic probes comprises between two and eight ultrasonic probes.

10. The apparatus of claim 1, wherein the one or more ultrasonic probes generate ultrasonic waves at frequencies between approximately 10 kHz and 40 kHz.

11. The apparatus of claim 1, wherein the inlet chamber and the outlet chamber are separated by a baffle and wherein a surface of which is made to vibrate by the high-frequency vibrator positioned above the high thermal conductivity refractory baffle placed between the inlet chamber and the outlet chamber.

12. The apparatus of claim 1, further comprising one or more heating elements to maintain the temperature of liquid metal within the inlet or outlet chamber of the degassing apparatus.

13. A system for degassing a liquid metal, the system comprising:

a housing defining an inlet chamber and an outlet chamber that are separated by a baffle of a first height, wherein liquid metal is introduced into the inlet chamber and wherein the baffle defines a first surface over which at least some of the liquid metal will flow between the inlet chamber and the outlet chamber;

a vacuum system that induces the liquid metal in the inlet chamber to be drawn up to the first height so as to flow over the first surface;

a vibration system that vibrates the first surface when the liquid metal is flowing over the first surface at a frequency that induces dissolved gases in the liquid metal to flow out of the liquid metal flowing over the first surface.

14. The system of claim 13, further comprising a wave source that introduces waves into the liquid metal in the inlet chamber so as to induce dissolved gases in the liquid metal to precipitate, coalesce, and flow out of the liquid metal.

15. The system of claim 14, wherein the wave source comprises at least one ultra-sonic probe.

16. The system of claim 15, wherein the at least one ultrasonic probes generate ultrasonic waves at frequencies between approximately 10 kHz and 40 kHz.

17. The system of claim 13, wherein the vacuum system comprises an air venturi ejector which is capable of maintaining negative gauge pressures in the inlet chamber of at least approximately −200 millibars so as to induce gas in the inlet chamber to rise to the level of the first surface and to further induce gasses in the liquid metal to flow out of the liquid metal.

18. The system of claim 13, wherein the liquid metal is liquid aluminum, and the system is configured to reduce dissolved hydrogen to at least approximately 0.07 cc per 100 grams of aluminum while maintaining the liquid aluminum within the system for approximately five minutes or less.

* * * * *